United States Patent [19]

Hagin et al.

[11] Patent Number: 4,843,907
[45] Date of Patent: Jul. 4, 1989

[54] HYDROMECHANICAL POWER SPLITTING TRANSMISSION FOR VEHICLES

[75] Inventors: Faust Hagin; Hans Drewitz, both of Munich, Fed. Rep. of Germany

[73] Assignee: MAN Nutzfahrzeuge GmbH, Munich, Fed. Rep. of Germany

[21] Appl. No.: 227,344

[22] Filed: Aug. 2, 1988

[30] Foreign Application Priority Data

Aug. 6, 1987 [DE] Fed. Rep. of Germany ....... 3726080

[51] Int. Cl.$^4$ .............................................. F16H 47/04
[52] U.S. Cl. ......................................... 74/687; 74/720
[58] Field of Search ........................ 74/687, 720, 720.5

[56] References Cited

U.S. PATENT DOCUMENTS

| | | | |
|---|---|---|---|
| 3,884,095 | 5/1975 | Miyao et al. | 74/687 |
| 3,969,958 | 7/1976 | Miyao et al. | 74/687 |
| 3,990,327 | 11/1976 | Margolin | 74/687 |
| 4,008,628 | 2/1977 | Orshansky, Jr. | 74/687 |
| 4,286,477 | 9/1981 | Meyerle et al. | 74/687 |
| 4,291,592 | 9/1981 | Meyerle et al. | 74/687 |
| 4,313,351 | 2/1982 | Hagin | 74/687 |
| 4,382,392 | 5/1983 | Meyerle et al. | 74/687 |
| 4,446,756 | 5/1984 | Hagin | 74/687 |

FOREIGN PATENT DOCUMENTS

| | | | |
|---|---|---|---|
| 2463335 | 3/1981 | France | 74/687 |
| 35558 | 3/1979 | Japan | 74/687 |
| 147148 | 7/1987 | Japan | 74/687 |

Primary Examiner—Dwight G. Diehl
Attorney, Agent, or Firm—Roberts, Spiecens & Cohen

[57] ABSTRACT

A hydromechanical power splitting transmission for use between the prime mover and the axle power train of a vehicle having a planetary differential drive with at least two series of planetary wheels, two sun wheels, a web and annulus, a drive input shaft and a drive output shaft, connected with different shafts of the planetary differential drive. There are furthermore at least first and second hydrostatic machines, which in at least one operational range are connected with one shaft of the planetary differential drive and at least the first of the hydrostatic machines is able to be switched over from its own shaft to another on changing the operational range by clutches, while the second hydrostatic machine is at least substantially stationary. In the operational state of the vehicle in which the ratio of $n_{output}$ to $n_{input}$ > approximately 50%, the first hydrostatic machine is connected to the transmission output shaft via one of two speed change devices of different size, selectively operated by a two way clutch. The larger of the two change speed devices is used for forward travel at creep speed and predominantly for reverse of the vehicle and is switched over into this drive ratio when the transmission is stationary.

7 Claims, 4 Drawing Sheets

HYDROMECHANICAL POWER SPLITTING TRANSMISSION FOR VEHICLES

BACKGROUND OF THE INVENTION

The invention relates to hydromechanical power splitting transmissions for use between the prime mover and the axle power train of a vehicle, more particularly a commercial vehicle of the type comprising a planetary differential drive with at least two series of planetary wheels, two sun wheels, a web and an annulus, furthermore a drive input shaft and a drive output shaft, connected with different shafts of the planetary differential drive, with at least first and second hydrostatic machines, which in at least one operational range are connected with one shaft of the planetary differential drive and at least the first of said hydrostatic machines is able to be swtiched over from its own shaft to another on changing the operational range by means of clutches, while the second hydrostatic machine is at least substantially stationary.

Such s transmission has for instance been proposed in the U.S. Pat. No. 4,313,351, see FIG. 1. In such a transmission the output torque in reverse is only equal to approximately 50% of that during forward travel. This is due to the following reasons: during forward travel the torque of one hydrostatic machine connected to the output shaft and the torque of the prime mover and the supporting torque of the other hydrostatic machine (control power machine) are summated. In reverse on the other hand the torque of the prime mover and of the hydrostatic machine are subtracted from the torque of the hydrostatic machine connected to the output shaft. In reverse this leads to unsatisfactory drive conditions.

SUMMARY OF THE INVENTION

Accordingly, one object of the invention is to so provide a hydromechanical power splitting transmission of the initially specified that a higher driving torque is available, at least during reverse travel of the vehicle.

In order to achieve this or other purposes appearing from the present specification and drawings, the transmission is so designed that in the operational state of the vehicle in which the ratio of $n_{output}$ to $n_{input}$ > approximately 50% (wherein n denotes speed of rotation) the first hydrostatic machine is connected via one of two speed change means of different size, able to be put into operation by two way clutch means, with the transmission output shaft, the larger of the two change speed means being used for forward travel at creep speed and predominantly for reverse of the vehicle and being switched over into this drive ratio when the transmission is stationary.

Since in the operational range in which $n_{output}$ to $n_{input}$ > approximately 50% one of the hydrostatic machines connected with the transmission output shaft via two selectively operable change speed means, when the larger of the two change speed means is coupled, the vehicle may be driven forwards at creep speed or—and this is more usually the case—in reverse with a substantially increased drive torque.

A detailed description will now be given of the hydromechanical transmission in accordance with the invention with reference to the drawing showing one embodiment thereof.

DETAILED DESCRIPTION OF WORKING EMBODIMENT OF THE INVENTION

Figure 1:
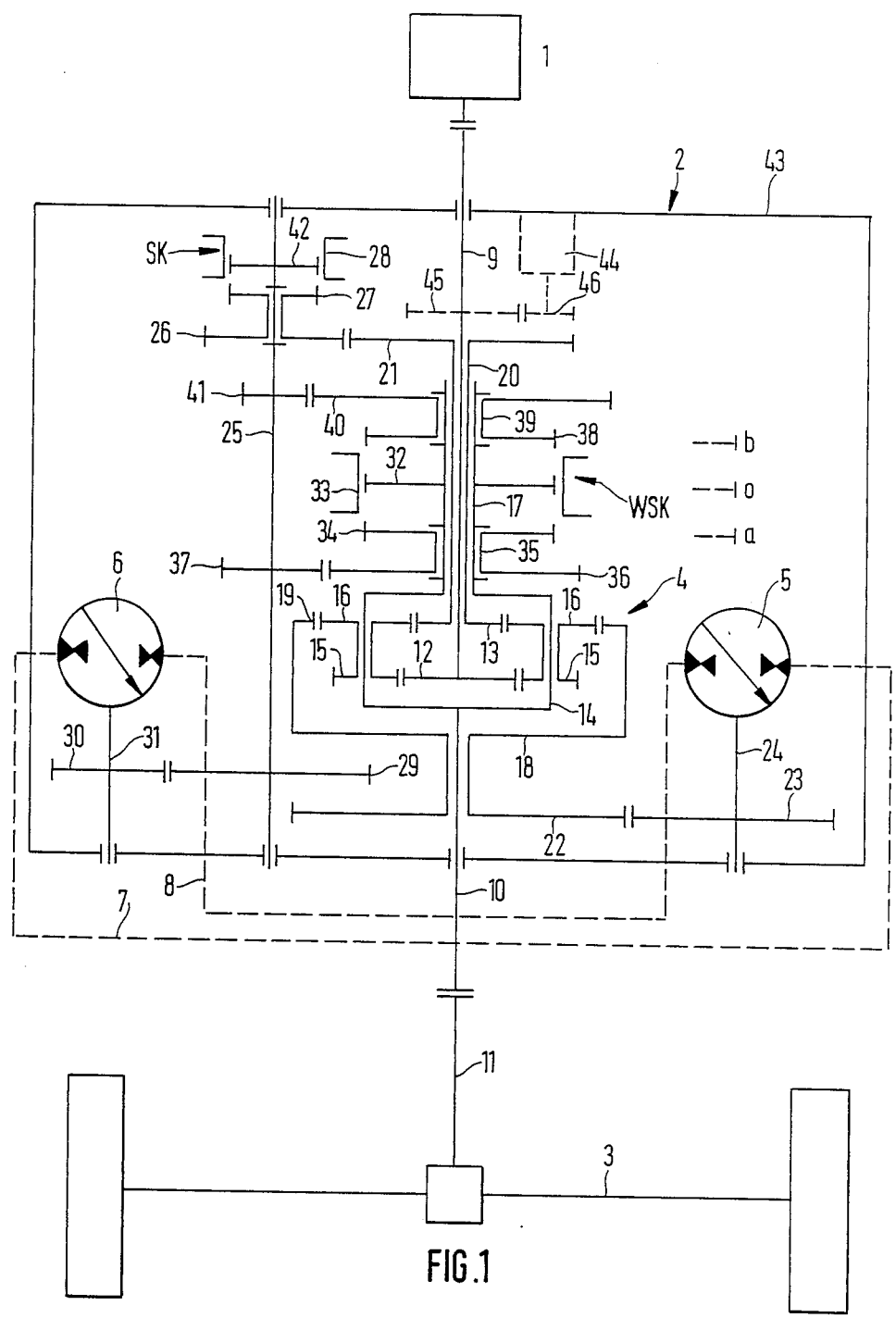
FIG. 1 diagrammatically shows a hydromechanical power splitting transmission incorporating the means of the invention.

In the drawings reference 1 denotes a prime mover, more especially in the form of a diesel engine, while reference 2 denotes a speed changing means in the form of a hydromechanical power splitting transmission and reference 3 denotes the drive axle of the vehicle. The vehicle is more especially a commercial vehicle such as a truck or omnibus. The power splitting transmission 2 has at least two operational ranges and is made up of a planetary differential drive 4 and two hydrostatic machines 5 and 6, which may be driven in both directions as a pump or a motor and are connected together by hydraulic lines 7 and 8. Reference 9 denotes a drive input shaft directly connected with the prime mover 1 or connected with it via a clutch which is not illustrated. Reference 10 denotes the transmission output shaft which is connected with the axle power train 11 of the vehicle. The planetary differential drive 4 comprises a large sun wheel 12 keyed on the input shaft 9, a small sun wheel 13, a number of double planetary wheels 15 and 16 rotatably mounted on the web 14 (which is keyed to the output shaft 10), a hollow shaft 17 connected with the web 14 and coaxial thereto, and an annulus 18. The latter has internal gear teeth 19 which are in mesh with the teeth of the planetary wheels 16. The small sun wheel 13 is keyed on a hollow shaft 20, which is rotatable on the transmission input shaft 9 and furthermore carries a gear wheel 21 and rotatably supports the hollow shaft 17. A gear wheel 22 is locked to the annulus 18 for rotation therewith and is in mesh with a gear wheel 23, which is keyed on the shaft 24, which produces the drive connection with the hydrostatic machine 5. The gear wheel 21 mounted on the hollow shaft 20 is in mesh with a gear wheel 26 which is rotatably mounted on a shaft 25 on which it is locked to prevent axial motion in relation thereto. The gear wheel 26 is connected via a hollow shaft with the drive disk 27 of a clutch SK so that the gear wheel 26 rotates with the disk 27. The clutch SK has an operating ring 28. The shaft 25 is able to directly produce the mechanical connection between the planetary differential drive 4 and the hydrostatic machine 6; in this case the hydrostatic machine 6 would have its shaft directly connected with the shaft 25. However in the illustrated design the shaft 25 forms an intermediate shaft, on which a gear wheel 29 is keyed which as part of a change speed means 29 and 30 leading to the hydrostatic machine 6 is in mesh with a gear wheel 30, which is keyed on a shaft 31, which produces the mechanical connection with the hydrostatic machine 6.

In accordance with the invention the hydrostatic machine 6 is able to be connected via at least two change speed means with the transmission output shaft 10. For this purpose the hollow shaft 17 keyed to the web 14 has a central drive wheel 32 of a two-way clutch WSK keyed thereon, the operating ring of the clutch WSK being denoted 33. The operating ring 33 of the two-way clutch WSK may assume a neutral setting (see FIG. 1) and two drive transmission settings a and b (see FIGS. 2 and 4), in which respectively different transmission ratios are provided.

In a first position differing from the neutral setting (see FIG. 2) the drive wheel 32 is connected via the two-way clutch WSK with a drive wheel 34, which is mounted on a hub 35 rotatable on the hollow shaft 17 so that such drive wheel is axially held while being free to rotate on the hub 35. A gear wheel 36 keyed on the hub 35 meshes with a gear wheel 37 keyed on the intermediate shaft 25. In this first clutch setting a there is a first drive ratio between the hydrostatic machine 6 and the drive output shaft 10 in which there is operation of the vehicle in the range in which $n_{output}$ to $n_{input}$ < approximately 50% in the forward travel direction.

In a second clutch setting b departing from the neutral setting (see FIG. 4) the drive wheel 32 is connected by way of the operating ring 33 of the two-way clutch WSK with a drive wheel 38, which is mounted on a hub 39 which is rotatably mounted on the hollow shaft 17 on which it is axially locked. The drive wheel 38 has a gear wheel 40 keyed thereon. This wheel meshes with a gear wheel 41 keyed on the intermediate shaft 25. The transmission ratio between the gear wheel 41 and the gear wheel 40 is for instance 1 to 4.5 and is larger than the ratio, amounting for instance to 1 to 2.5, between the gear wheel 37 and the gear wheel 36 in the first clutch setting a. In this second clutch setting b of the two-way clutch WSK there is thus a second, large drive ratio from the hydrostatic machine 6 to the drive output shaft 10, which when the truck is moving forwards or more especially in reverse in the range in which $n_{output}$ to $n_{input}$< approximately 50% provides for an enhanced drive torque.

Figure 3:
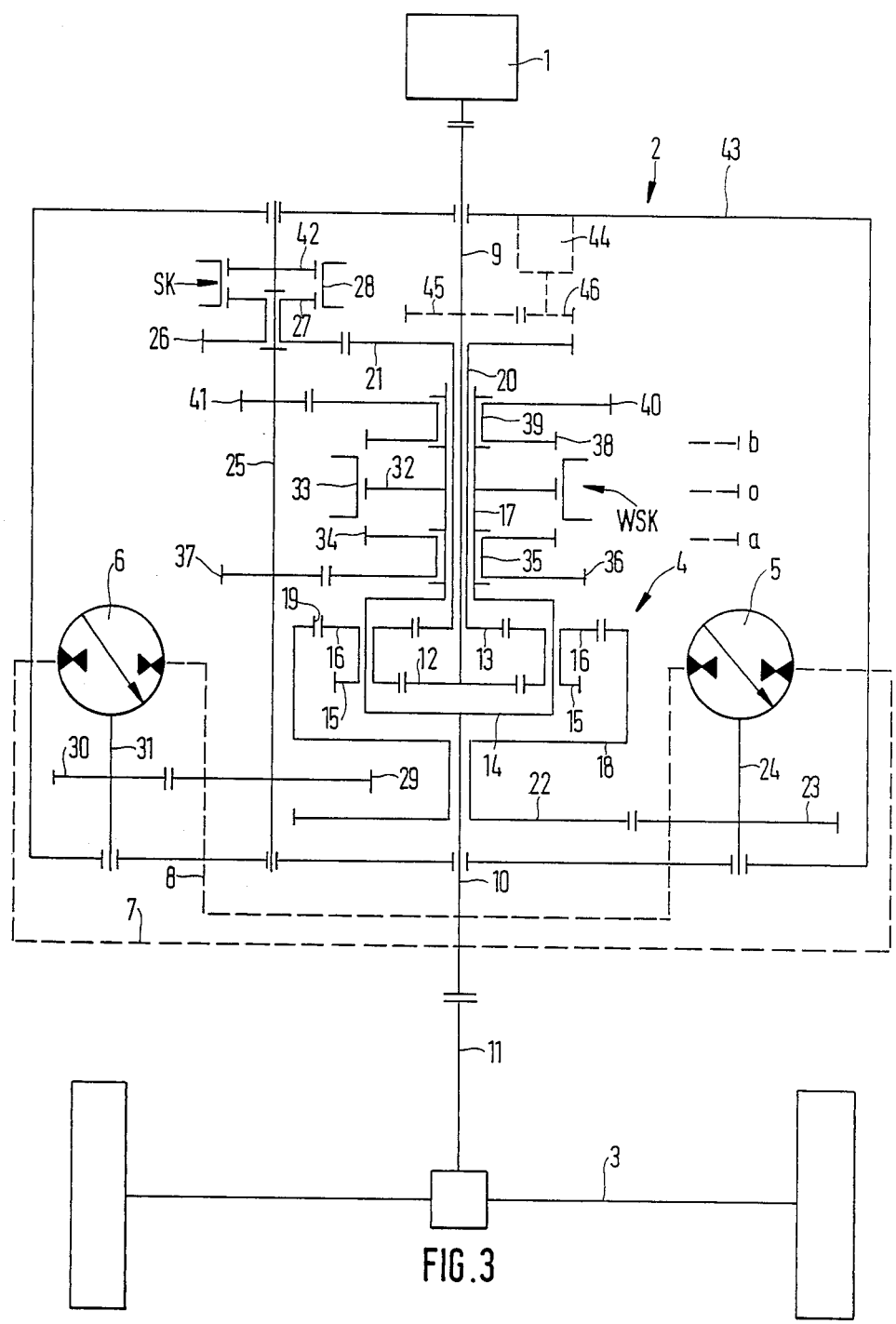

In a second operational range of the vehicle $n_{output}$ to $n_{input}$>approximately 50%) via the operating ring 28 of the clutch SK a further drive transmission ratio takes effect between the hydrostatic machine 6 and the transmission output shaft 10. The operating ring 28 of the clutch SK then connects a drive disk 42 placed behind the drive disk 27 adjacent thereto and keyed on the intermediate shaft 25 with the drive disk 27 so that in this case the gear wheel 26 is coupled with the intermediate shaft 25 and as a result via the gear wheel 21 and the hollow shaft 20 the small sun wheel 13 thereon is active in the drive. This drive connection is indicated in FIG. 3. In the first operating range of the vehicle this drive connection is not provided for, the operating ring 28 of the clutch SK then being set in its disconnected state.

The speed of rotation of the transmission output shaft 10 represents the sum of the speeds of the large sun wheel 12 and of the hollow wheel 18, which set the peripheral speeds of the planetary wheels 15 and of the web 14, respectively. The speed and the direction of rotation of the hydrostatic machine 5 control the speed and direction of the annulus 18 with which it is connected via the gear wheels 23 and 22.

Figure 2:
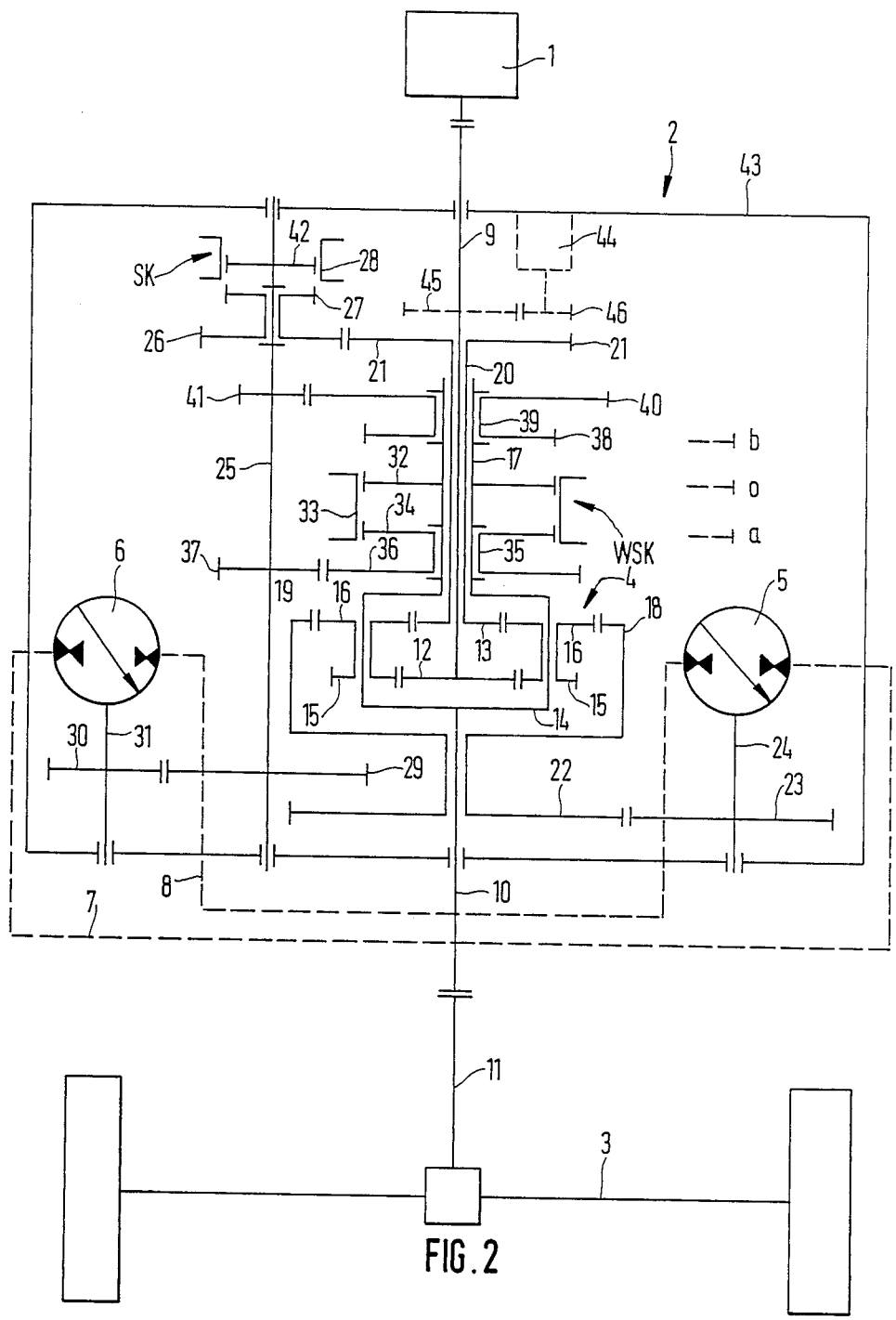
FIGS. 2 to 4 respectively show the power splitting transmission of FIG. 1 in a different power transmitting states.

If the drive output shaft 10 and the vehicle driven thereby is to be accelerated in a first operational range ($n_{output}$ to $n_{input}$<approximately 50%) for normal travel forwards, the operating ring 33 of the two-way clutch WSK is moved out of its neutral setting into the first clutch setting a as shown in FIG. 2. Then in one direction of rotation of the annulus 18 opposite to the direction of rotation of the large sun wheel 12 driven from the prime mover 1, the hydrostatic machine 5 operates as a pump and supplies the converted power to the hydrostatic machine 6. The latter operates as a motor and drives the shaft 31 so that the power is transmitted via the gear wheels 30 and 29 to the intermediate shaft 25, with the gear wheel 37 and from the latter via the gear wheel 36 and the two way clutch WSK activated in the first clutch setting a, to the hollow shaft 17 and from the latter via the web 17 to the drive output shaft 10.

Figure 4:
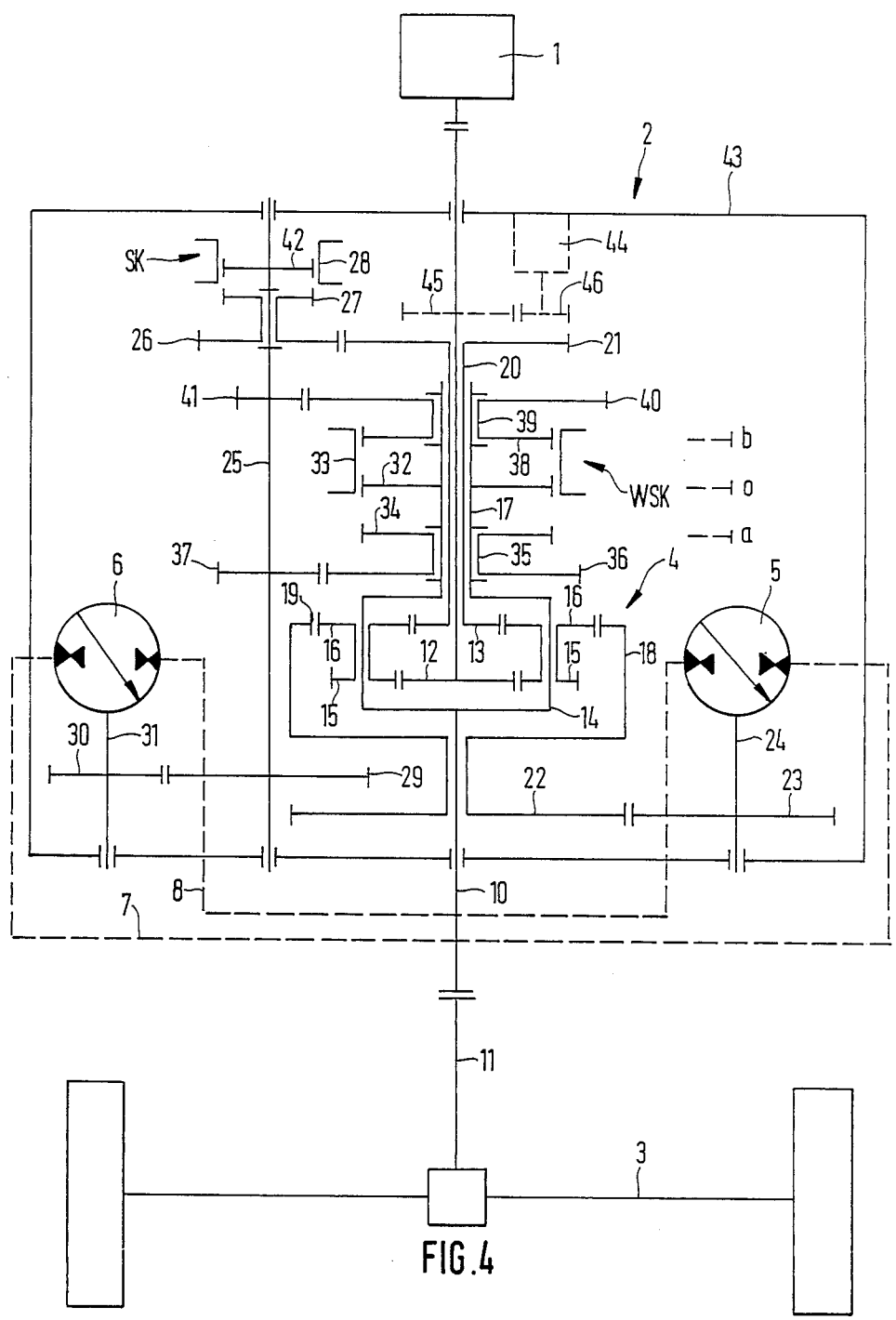

At the end of this operational range, the speed of rotation of the hydrostatic machine 5 will have dropped to such a low value that the hydrostatic machine will be more or less stationary. When it is stationary practically the full power of the prime mover 1 will be transmitted by the planetary differential drive 4 mechanically to the drive output shaft 10. If now the vehicle is to be further accelerated, there is in this situation a transistion to the second operational range ($n_{output}$ to $n_{input}$>approximately 50%) caused by switching over the operating ring 33 of the two way clutch WSK into its neutral position and operation of the operating member 28 of the clutch SK for connecting the gear wheel 26 with the intermediate shaft 25. This is indicated in FIG. 3. The drive power for the hydrostatic machine 6 is thus transmitted via the small sun wheel 13 via the hollow shaft 20, the gear wheels 21 and 26, the intermediate shaft 25, the gear wheels 29 and 30 and the shaft 31. In this second operational range, the hydrostatic machine 5 now operates as a motor with the annulus 18 and the large sun wheel 12 turning in the same direction, the said hydrostatic machine 5 receiving its driving power from the hydrostatic machine 6 now operating as a pump via the hydraulic connecting lines 7 and 8. If on the other hand the vehicle is to be driven forwards at creep speed via the drive output shaft 10 ($n_{output}$ to $n_{input}$<approximately 50%), with the clutch SK in the unclutched condition the operating ring 33 of the two way clutch WSK is shifted from its neutral setting into its second switching setting b as is indicated in FIG. 4. The hydrostatic machine 5 operates in this case in precisely the same manner as for normal forward travel as a pump and supplies the converted power via the lins 7 and 8 to the hydrostatic machine 6. The latter operates as a motor and drives the shaft 31 and - via the gear wheels 30 and 29 - the intermediate shaft 25. In this case the power is the transmitted, in accordance with then desired creep speed of the vehicle, via the larger transmission ratio of the gear wheels 41 and 40 drivingly connected with the hollow shaft 17, and via the web 14 to the transmission output shaft 10 with the result that there is a lower output speed but a higher driving torque.

For acceleration from the creep speed range of the vehicle up to the normal travel the operating ring 33 of the two way clutch WSK is shifted into its setting a.

If on the other hand the drive output shaft 10 and the vehicle driven thereby in the first operational range ($n_{output}$ to $n_{input}$ <approximately 50%) is to be accelerated from standstill in reverse, the same settings are produced in the transmission system as for forward travel at creep speed, as will be seen from FIG. 4. The only departure from the setting for forward travel at creep speed is that for reverse the direction of rotation of the hydrostatic machine 6 and the pressures in the hydraulic lines 7 and 8 are reversed.

The design in accordance with the invention thus makes possible the advantage of being able to operate the vehicle in the range in which $n_{output}$ to $n_{input}$<approximately 50% with two different transmission ratios, which are caused to modify the ratio of the differential drive 4 for adaptation to suit certain opeating conditions.

Furthermore the design of the hydromechanical power splitting drive 2 as shown in the figures makes possible the accommodation of a supply pump 44 for the hydrostatic circuit and the drive via the gear wheels 45 and 46 from the transmission input shaft 9 in the housing 43 in front of the foremost gear wheel 21, without enlarging the housing 43 of the drive 2.

The operating rings 33 and 28 of the two way clutch WSK and SK respectively are operated by means which are not shown and which receive their control signals from a control device which is not shown either.

What is claimed is:

1. A hydro mechanical power splitting transmission between a prime mover and a drive train of a vehicle comprising:
   a planetary differential drive means including an input shaft driven from a prime mover and an output shaft for driving a drive train of a vehicle, two sets of planetary gears, two sun wheels of different diameter in mesh with said planetary gears, the sun wheel of larger diameter being driven by the input shaft, and a third shaft drivingly connected to the sun wheel of smaller diameter,
   first and second hydrostatic machines,
   a first gear transmission drivingly connecting said first hydrostatic machine to the input shaft and the third shaft via said planetary differential drive means,
   a second gear transmission including two way clutch means for drivingly connecting said second hydrostatic machine to said output shaft in a first operational range in which the ratio of the speed of the output shaft to the input shaft, $n_{output}: n_{input}$, >about 50%, whereas in a second operational range in which $n_{output}: n_{input}$ <about 50% the second gear transmission drivingly connects the second hydrostatic machine to the small sun wheel, said second gear transmission further including two speed change means selected respectively by said two way clutch means, said two speed change means providing two different transmission ratios, the speed change means of larger transmission ratio being selected by said two way clutch means during very slow vehicle speed both in forward and reverse travel with the output shaft stationary,
   each of said two speed change means comprising first and second gear wheels of respective different diameters, the gear wheels of smaller diameter of the respective speed change means being drivingly connected to second hydrostatic machine, and means including said two way clutch means for drivingly connecting the gear wheels of larger diameter of the respective speed change means to the output shaft.

2. The hydromechanical power splitting transmission as claimed in claim 1 wherein the means for drivingly connecting the gear wheels of larger diameter to the output shaft comprises a hollow shaft drivingly connected to the output shaft and a central driving wheel fixed to said hollow shaft and selectively connected to the respective gear wheels of larger diameter of the speed change means by said two way clutch means.

3. The hydromechanical power splitting transmission as claimed in claim 2 wherein the differential drive means comprises an annulus drivingly connected to said planetary gears, said first gear transmission drivingly connecting said first hydrostatic machine to said annulus, said second gear transmission comprising an intermediate shaft driven by said second hydrostatic machine, said gear wheels of smaller diameter of the respective speed change means being secured for rotation with said intermediate shaft.

4. The hydromechanical power splitting transmission as claimed in claim 3 wherein said differential drive means further includes a web drivingly connected to said output shaft, said hollow shaft being fixedly connected to said web, and two hubs respectively mounting the gear wheels of larger diameter of the two speed change means on said hollow shaft for rotation thereon in axially fixed position, a drive wheel fixed on each hub, said two way clutch means including an operating ring which is movable to selectively connect said central driving wheel with said drive wheels.

5. The hydromechanical power splitting transmission as claimed in claim 4 wherein said third shaft is hollow and is disposed within said hollow shaft.

6. The hydromechanical power splitting transmission as claimed in claim 3 wherein said second gear transmission comprises a third gear arrangement, including a clutch, driven from said intermediate shaft for driving said third shaft.

7. The hydromechanical power splitting transmission as claimed in claim 6 wherein said third gear arrangement comprises a third gear wheel rotatably mounted on said intermediate shaft in axially secured position, a drive disk secured in rotation to said third gear wheel, a further drive disk secured for rotation with said intermediate shaft, said clutch including a movable operating ring for selectively connecting said drive disks for rotation together thereby drivingly connecting said intermediate shaft and said third gear wheel, a fourth gear wheel in mesh with said third gear wheel and fixed to said third shaft such that in said second operational range said second hydrostatic machine is able to drive the planetary differential drive means via said intermediate shaft and said third gear arrangement when said clutch connects said drive disks and said two way clutch means is in a neutral state.

* * * * *